United States Patent [19]

Fujita et al.

[11] Patent Number: 5,793,971
[45] Date of Patent: Aug. 11, 1998

[54] VIDEO SIGNAL OUTPUT APPARATUS HAVING NEAR VIDEO-ON-DEMAND FUNCTION

[75] Inventors: Hiroyuki Fujita; Yuichi Kojima, both of Kanagawa, Japan

[73] Assignee: Sony Corporation, Tokyo, Japan

[21] Appl. No.: 569,243

[22] PCT Filed: Apr. 25, 1995

[86] PCT No.: PCT/JP95/00813

§ 371 Date: Dec. 22, 1995

§ 102(e) Date: Dec. 22, 1995

[87] PCT Pub. No.: WO95/29557

PCT Pub. Date: Nov. 2, 1995

[30] Foreign Application Priority Data

Apr. 25, 1994 [JP] Japan ............... 6-086091
Oct. 31, 1994 [JP] Japan ............... 6-266788

[51] Int. Cl.⁶ ............... H01J 13/00; H04N 7/14; H04H 1/00
[52] U.S. Cl. ............... 395/200.49; 348/7; 348/12; 455/5.1
[58] Field of Search ............... 348/6, 7, 12, 13; 455/3.1, 4.1, 4.2, 5.1, 6.1; 395/200.47, 200.48, 200.49; H04N 7/10, 7/14, 7/16, 7/173

[56] References Cited

FOREIGN PATENT DOCUMENTS

| 4-324784 | 11/1992 | Japan ............... H04N 7/16 |
| 5-41858 | 2/1993 | Japan ............... H04N 7/10 |
| 6-282846 | 10/1994 | Japan ............... G11B 7/00 |
| 7-23369 | 1/1995 | Japan ............... H04N 7/173 |
| 7-123398 | 5/1995 | Japan ............... H04N 7/173 |

OTHER PUBLICATIONS

Computer Networks and ISDN Systems, vol. 22, No. 2, Sep. 1991, Amsterdam, NL, pp. 155–162, XP000225399 W.D. Sincoskie: System architecture for a large scale video on demand service.

Storage and Retrieval for Image and Videodatabases II, Feb. 7, 1994, San Jose, CA, USA, pp. 208–211, XP002011316, Ed Chang et al.: "Scalable Video Data Placement on Parallel Disk Arrays".

Primary Examiner—John K. Peng
Assistant Examiner—John W. Miller
Attorney, Agent, or Firm—Frommer Lawrence & Haug LLP; William S. Frommer

[57] ABSTRACT

In this invention, it is possible to realize a video signal output apparatus having so called Near Video On Demand function such that, in respective reproducers of a plurality of reproduction blocks within a video reproduction section, with respect to a plurality of divided image sources obtained by dividing an image source into image sources of a plurality of time zones, divided image sources of the same time zone are simultaneously repeatedly reproduced in the state where they are respectively shifted by a predetermined time to carry out switching between a plurality of video signals delivered from the plurality of reproducers by a video select switch to thereby provide successive image sources, without being conscious of time and switching operation of image sources reproduced in accordance with selection of a desired image source by the viewer also with respect to image source of data quantity corresponding to time longer than the memory capacity of each of media of the reproducers.

4 Claims, 10 Drawing Sheets

FIG.13

VIDEO SIGNAL OUTPUT APPARATUS HAVING NEAR VIDEO-ON-DEMAND FUNCTION

TECHNICAL FIELD

This invention relates to a video signal output apparatus adapted for providing, as a plurality of channels, a plurality of video signals of the same image source while shifting the supply starting times with respect to the same image source.

BACKGROUND ART

Such video signal output apparatuses having so called Near Video On Demand function to reproduce the image source of a program at a desired time of the viewer (listening and viewing person) to provide video signals reproduced from the image source to terminal equipments of the viewer side through a communication network have been proposed. Among such video signal output apparatuses, apparatuses adapted for outputting images (video signals) of the same content in the state where they are shifted by a predetermined time have been proposed. In the video signal output apparatuses, for reproduction of stored (accumulated) image sources, e.g., video tape recorder (VTR), optical disc player and hard disc unit, etc. are used.

Figure 1:
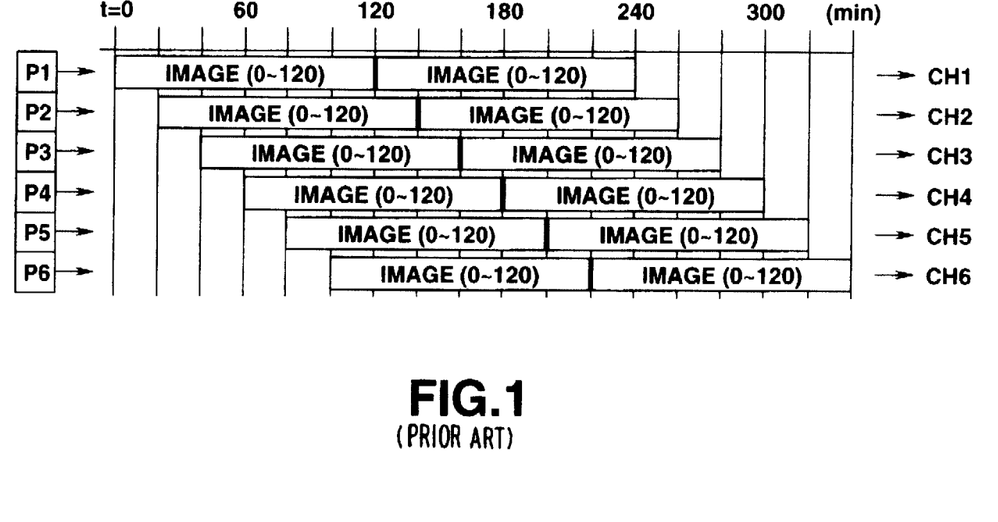
FIG. 1 is a view for explaining control in carrying out image reproduction of 2 hours in a conventional video signal output apparatus.

The video signal output apparatus includes, e.g., six reproducing units P1~P6 as shown in FIG. 1, for example. The total reproduction time of video signals in these reproducing units P1~P6 is dependent upon memory capacitors of media that the respective reproducing units have. The reproducing units P1~P6 of FIG. 1 respectively represent image sources of 120 minutes as images (0~120) to allow video signals relating to these image sources to correspond to channels CH1~CH6. The image sources of the channels CH1~CH6 are all video sources of the same content. These reproducing units P1~P6 reproduce the image sources of the same content in the state where they are shifted by a predetermined time.

In this case, the shifted time is 20 minutes. The viewer selects a desired image source from the terminal equipment thereafter to carry out selective switching between channels CH1~CH6 to output the selected image source, from the leading portion thereof, at the timing that wait time is the shortest from the current time point, among the reproducing units P1~P6 which reproduce video sources. Thus, a video signal of the channel which has been subjected to selective switching is supplied from the video signal output apparatus to the terminal equipment. Since the video signal output apparatus is constituted in this way, the viewer can accept an offer of a desired image in the wait time of 20 minute at the maximum.

Meanwhile, in the case where data quantity of one image source is greater than the memory capacity of the medium, the image source would fail to be contained in the medium within the reproducing unit of one unit. In this case, it is conceivable to reproduce the image source of the portion which is above the memory capacity of the medium from any other reproducing unit.

Figure 2:
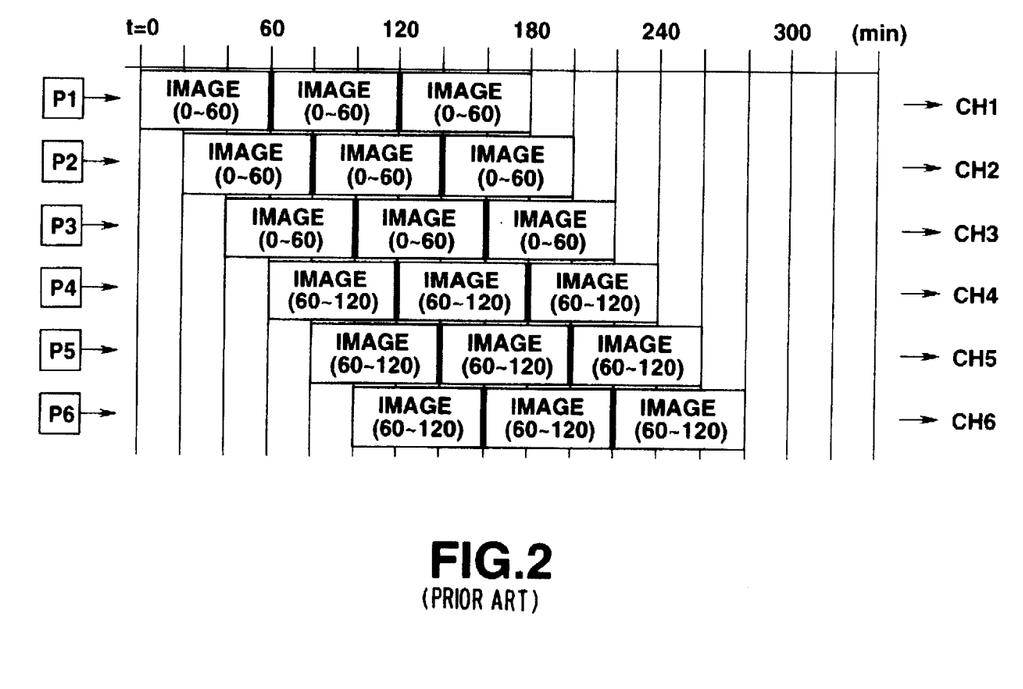
FIG. 2 is a view for explaining image reproduction in the case where reproducible time is shorter than the length of image source in the conventional video signal output apparatus.

In such a case, as shown in FIG. 2, for example, the video signal output apparatus is operative to respectively reproduce the first half portion and the latter half portion obtained by halving the same image source at the reproducing units P1~P3 and the reproducing units P4~P6. In FIG. 2, the image source of the first half portion is represented as image (0~60) and the image source of the latter half portion is represented as image (60~120). Thus, e.g., the reproducing units P4~P6 reproduce the image source [image (60~120)] subsequently to the image source [image (0~60)] that the reproducing units P1~P3 output.

When the viewer selects the channel in which the wait time is the shortest among output channels CH1~CH3 of the reproducing units P1~P3, he must select the channel which continuously outputs the image source [image (60~120)] subsequent to the image source [image (0~60)] without wait time from the channels CH4~CH6 after output of the image of the first half portion is completed.

When a medium of small memory capacity, such as, for example, hard disc, etc. is applied to the reproducing unit, there frequently take place instances where one image source fails to be contained within one medium, i.e., reproduction of the type which copes with long time cannot be carried out. When the viewer accepts an offer of image source by such a configuration, he must carry out, simultaneously with the termination (completion) of the reproduction time at a certain channel of the image source which has been provided, switching operation to any other channel which continues the image source.

However, for the viewer, the switching operation from the terminal equipment, which selects the channel in which the wait time until a desired image source is outputted is caused to be the shortest to further select a channel which continuously outputs the image source of the subsequent portion after output of the selected channel is completed, is a troublesome operation and is inconvenient.

This invention has been made in view of such actual circumstances, and its object is to provide a video signal output apparatus in which the viewer can enjoy outputted image sources without being conscious of time (limited reproduction time) and switching operation thereof, the configuration for realizing the Near Video On Demand system is caused to be simplified configuration, and cost can be reduced.

DISCLOSURE OF THE INVENTION

This invention has been proposed in order to attain the above-described object, and a video signal output apparatus according to this invention comprises: first reproducing means, with respect to first and second image sources obtained by dividing a video source into video sources of two time zones (time periods), for simultaneously repeatedly reproducing the first divided image source of a first time zone as a plurality of outputs from timings respectively shifted by a predetermined time; second reproducing means for simultaneously repeatedly reproducing the second divided image source as a plurality of outputs from the timings respectively shifted by the predetermined time; switching means including a plurality of input terminals respectively supplied with outputs of the first and second reproducing means, and a plurality of output terminals of which number is the same as that of the input terminals; and control means for controlling the switching means so as to carry out, every the predetermined time, switching of connection of the input terminals with respect to the respective output terminals so that the first divided image source and the second divided source are alternately outputted from the respective output terminals of the switching means.

Moreover, the first reproducing means, the second reproducing means, the switching means and the control means are provided with respect to respective different image video sources.

Further, a video signal output apparatus according to this invention comprises: a reproduction block including a plurality of reproducing means provided respectively with respect to a plurality of divided image sources obtained by dividing a video source into video sources of a plurality of time zones, the plurality of reproducing means being provided by the number determined by a total time of the divided image sources and a predetermined time for simultaneously repeatedly reproducing the divided image sources as a plurality of outputs in which reproduction timings are respectively shifted by the predetermined time, the plurality of the reproducing units being operative to simultaneously repeatedly reproduce the divided video sources as a plurality of outputs in the state where reproduction timings are respectively shifted by the predetermined time; and switching means including a plurality of input terminals respectively supplied with outputs of the plurality of reproducing means, and a plurality of output terminals of which number is the same as that of the input terminals; and control means for controlling the switching means so as to carry out, every the predetermined time, switching of connection of the input terminals with respect to the respective output terminals so that the plurality of divided image sources are sequentially outputted in accordance with the number of divisions.

In addition, the image source includes different plural image sources; the apparatus includes the plurality of the reproduction blocks corresponding to the number of the plural image sources; the switching means includes a plurality of input terminals of which number is the same as that of the reproducing means that those reproduction blocks have, and output terminals of which number is the same as that of the input terminals; and the control means controls the switching means so as to carry out, every the predetermined time, switching of connection of the input terminals with respect to the output terminals, with respect to the plurality of output terminals and the plurality of input terminals corresponding to the respective reproduction blocks so that the plurality of divided image sources corresponding to the respective reproduction blocks are sequentially outputted in accordance with the number of divisions from the respective plural output terminals corresponding to the respective reproduction blocks of the switching means.

BEST MODE FOR CARRYING OUT THE INVENTION

Respective embodiments of a video signal output apparatus according to this invention will now be described with reference to the attached drawings.

In the embodiment of this invention, there is disclosed one example of a video signal output apparatus having so called Near Video On Demand (NVOD) function to respectively repeatedly reproduce video signals obtained from an image source in the state where reproduction timings of the image source are shifted in a plurality of reproducing units in which the same image sources are recorded to output respective reproduced video signals through channels of which number corresponds to the number of the reproducing units, thus to carry out offer of video signals by channel selection from the viewer side.

In the case where data quantity of one image source is greater than the memory capacity of the medium, that image source fails to be contained in the medium within the reproducing unit of one channel. In this case, if image source of the portion which has exceeded the memory capacity of the medium is reproduced from any other reproducing unit, it is possible to provide a video signal output apparatus having Near Video On Demand function.

However, when the viewer accepts an offer of image source by such a configuration, he must carry out switching operation to the channel to continuously output the remaining portion of the image source at the time point when output time of the image source which has been provided is completed.

However, for the viewer, the switching operation from the terminal equipment, which selects the channel in which wait time until a desired image source is outputted is caused to be the shortest to further to select a channel to output video source continuous thereto after output of the image source from the selected channel is completed, is troublesome operation and is inconvenient. In order to solve such an inconvenience, this invention has proposed a video signal output apparatus which provides image sources by simple configuration so that the viewer can enjoy them without allowing the viewer to be conscious of time and switching operation of image source outputted.

Figure 3:
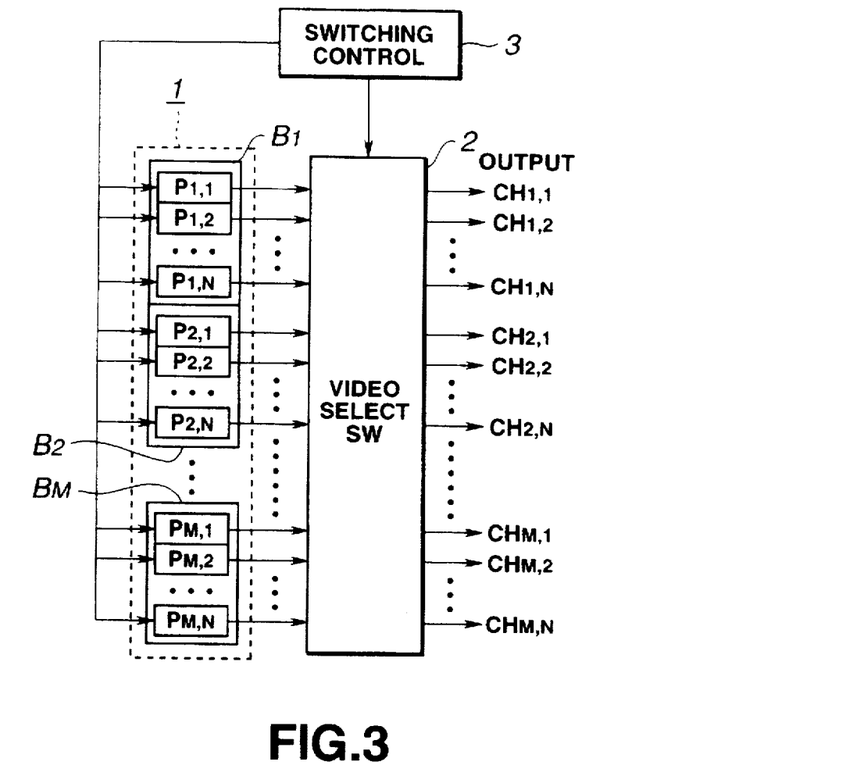
FIG. 3 is a block diagram showing outline of a first embodiment of a video signal output apparatus according to this invention.

The video signal output apparatus (unit) is composed, as shown in FIG. 3, for example, of a video reproduction section 1 including reproduction blocks B each having a plurality of reproducers P in which, with respect to a plurality of divided video sources obtained by dividing a video source into those of a plurality of time zones, the reproducers simultaneously repeatedly reproduce the divided image sources of the same time zone in the state where they are respectively shifted by a predetermined time; and a video selector (changeover) switch 2 for carrying out selective switching between a plurality of video signals delivered from the plurality of reproducers P of the video reproduction section 1.

Moreover, the video signal output apparatus is provided with a switching control section 3 for controlling selective switching between a plurality of video signals outputted from the video selector switch (labeled video select SW in the figure) 2.

The video reproduction section 1 employs, on the basis of the relationship which will be described later, a plurality of reproducers P each using, e.g., a medium of memory capacity smaller than the entire data quantity of image sources. As the reproducer P, an optical disc reproducing device, etc. is used.

Initially, the number of reproducers P constituting the video reproduction section 1 will be described.

The reproducer P of the video reproducing section 1 is adapted so that when data quantity of the image source is greater than the memory capacity of the medium of the reproducer P, the image source is divided every memory capacity of the reproducer P, and the portion above the memory capacity is stored in the medium of any other reproducer different from the reproducer. In this case, in order to continuously output the divided image sources so that only one image source is provided, reproducers P are required by the number of divisions of the original image source. This number is the same number as the number of reproduction blocks B. In FIG. 3, this number is M. Moreover, in order to simultaneously reproduce respective divided image sources at timings shifted by a predetermined time, reproducers P are required with respect to respective reproduction blocks B by the number N obtained when the total time of the divided image sources in the respective reproduction blocks B by the predetermined time. Accordingly, (M×N) reproducers P are required as a whole.

The reproduction operations of these reproduction blocks $B_1 \sim B_M$ are controlled in accordance with control signals respectively delivered from the switching control section 3. Namely, respective reproduction operations are controlled so that reproduction start interval between adjacent reproducers P is fixed. The respective reproduction blocks $B_1 \sim B_M$ outputs reproduced video signals to the video selector switch 2.

The switching control section 3 delivers control signals so as to control the operation of the video reproduction section 1 and switching of the video selector switch 2. Since such a configuration is employed, the video signal output unit has a plurality of channels $CH_{1,1}, CH_{1,2}, \ldots, CH_{1,n}, \ldots, CH_{M,N}$.

The operation of the video signal output unit will now be described with reference to FIGS. 4 and 5.

Figure 4:
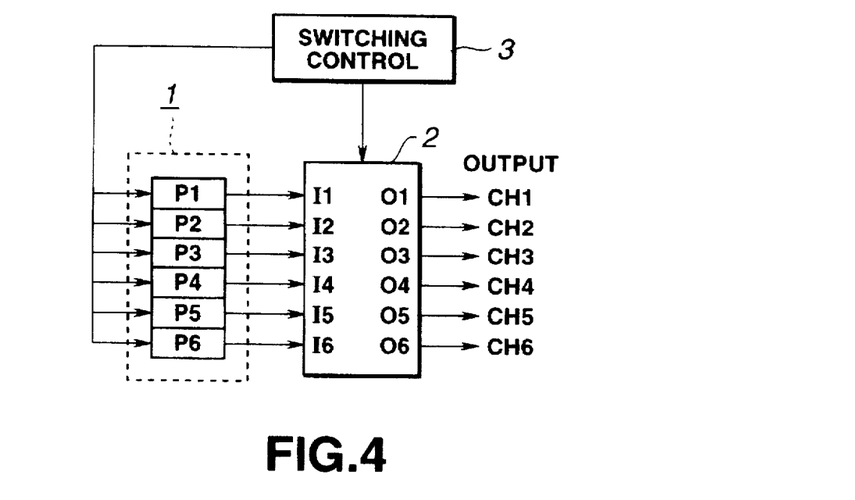
FIG. 4 is a block diagram of a simplified configuration of the video signal output apparatus.

In order to clarify the explanation of the operation of the video signal output unit, the configuration obtained by further simplifying the configuration of the video signal output unit shown in FIG. 3 is shown in FIG. 4.

The video reproducing section 1 is composed of reproducers P1~P6. This video reproducing section 1 is adapted to deliver video signals reproduced at reproducers P1~P6 to input terminals I1~I6 of the video selector switch 2. At the respective reproducers P1~P6, repetitive reproduction of video signals of 60 minutes is carried out.

Figure 5:
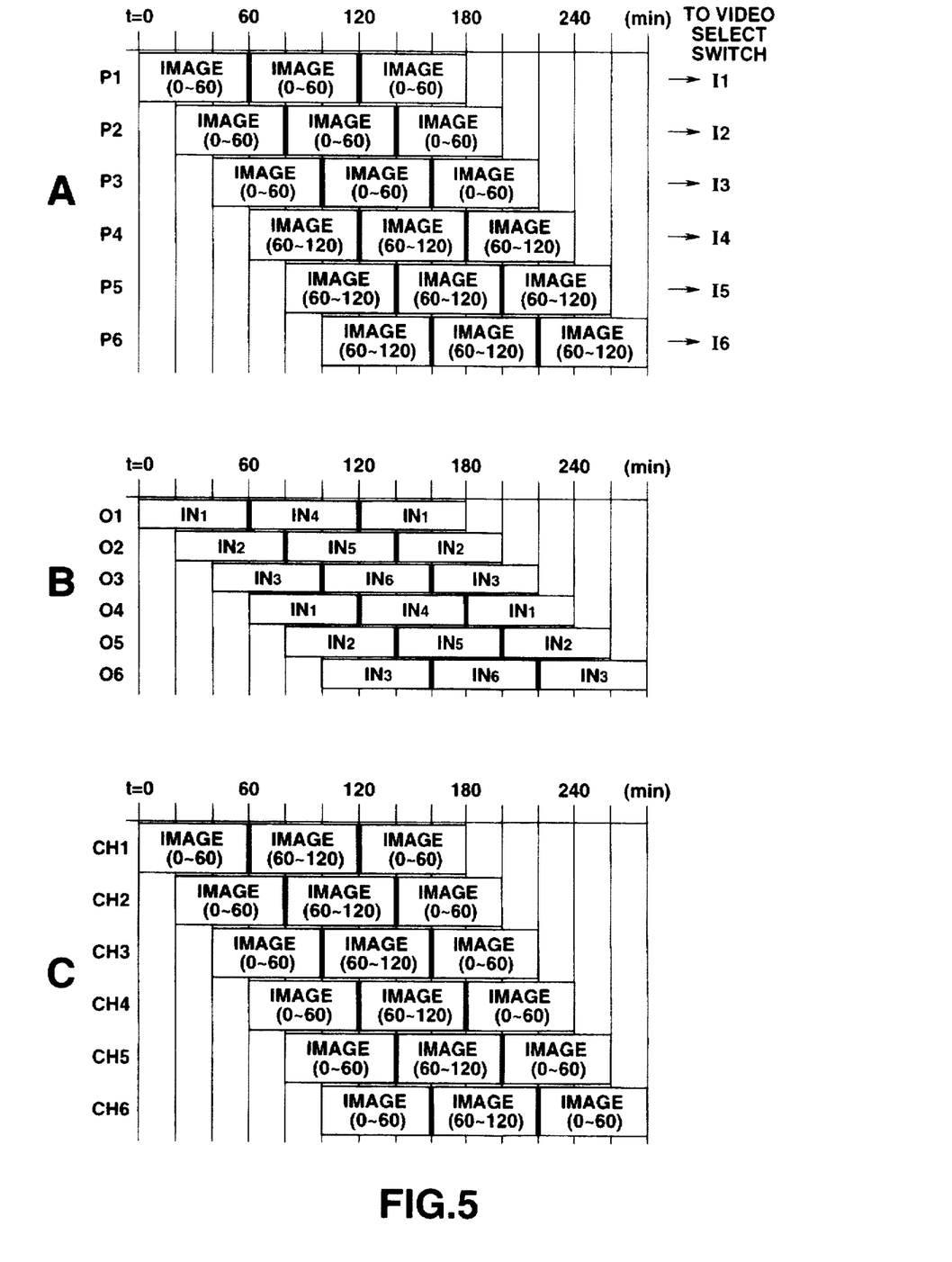
FIG. 5 is a view for explaining output timings of respective circuit components of the video signal output apparatus.

In this example, as apparent from FIG. 5A, the image source is caused to be divided image sources divided into that of the time zone of the first half and that of the time zone of the latter half. The divided video sources divided into the time zone of the first half and the time zone of the latter half are represented as divided image source |image (0~60)| and divided image source |image (60~120)|, respectively.

The divided video sources of the first half are stored in the three reproducers P1~P3, and the divided video sources of the latter half are stored in the three reproducers P4~P6, respectively. The divided image source |image (60~120)| stored in each of the media of the reproducers P4~P6 is divided image source obtained from the same image source as the divided image source |image (0~60)|, and the divided image source |image (0~60)| stored in each of media of the reproducers P1~P3 is image source of 60 minutes subsequent thereto. In this case, the three reproducers P1~P3 and the three reproducers P4~P6 correspond to the reproduction blocks B which have been explained with respect to the configuration of FIG. 3.

It is seen that, in this case, in respective reproducers P, video signals of 60 minutes are reproduced in the state where they are shifted by the interval of 20 minutes (i.e., the maximum wait time), whereby three reproducers P are required per each reproduction block. Moreover, from the condition where the image source is 120 minutes in terms of time and the memory capacity of the medium of the reproducer P is 60 minutes in terms of time, the video source of 120 minutes is divided into the divided image source |image (0~60)| and divided image source |image (60~120)| as shown in FIG. 5A. In order to realize the same reproduction as reproduction of one image source at the time of continuously reproducing two divided image sources divided in this way, at least two reproducers P are required.

General relationship for employing such an apparatus configuration will now be described by using a plurality of parameters. Parameters are set such that length of the image source is $L_v$ (min.), the maximum reproduction time of the reproducer P dependent upon the memory capacity of the medium is $L_m$ (min.), and shift time of reproduction (maximum wait time) in each reproduction block B is $T_i$ (min.). When these parameters are used, the number $P_{CONT}$ of reproducers P required for continuously outputting one image source is expressed as follows.

$$P_{CONT} = L_v / L_m \quad (1)$$

When the number of reproducers P required for reproducing one divided image source in the state where the reproduction timing is shifted by the time $T_i$ is assumed to be $P_{MU}$, the number of reproducers $P_{MU}$ is expressed as follows.

$$P_{MU} = L_m / T_i \quad (2)$$

In the above formulas, $Pcont_{CONT}$ and $P_{MU}$ are both represented by integer.

Accordingly, the number N of reproducers P as a whole required in this case is expressed as follows.

$$N = P_{CONT} \times P_{MU} = (L_v / L_m) \times (L_m / T_i) \quad (3)$$

By representing the number of reproducers by integer in this way, design of the video signal output unit is facilitated.

Respective reproducers P1~P6 carry out reproduction in the state where respective reproduction timings are shifted by the time $T_i$ by control signals from the switching control section 3.

Input terminals I1~I6 of the video selector switch 2 is respectively supplied with video signals from reproducers P1~P6. The video signals delivered to the input terminals I1~I6 are respectively represented by IN1~IN0. The video selector switch 2 carries out switching so as to maintain continuity of video signals outputted to respective channels CH1~CH6 with respect to halved divided image sources by control signals from the switching control section 3.

This switching operation is carried out as apparent from 5B in such a manner that for a time period of from 0 min. indicating reproduction start of divided video source |image (0~60)| from output terminals O1~O3 up to 60 min. of completion of reproduction, video signals $IN_1$~$IN_3$ from the reproducers P1~P3 are respectively outputted, and for a time period from 60 min. up to 120 min., video signals $IN_4$~$IN_6$ from reproducers P4~P6 are respectively outputted.

Moreover, the video selector switch 2 carries out switching so that for a time period from 60 min. indicating reproduction start of divided image source |image (0~60)| from output terminals O4~O6 up to completion of reproduction of 120 min., video signals $IN_1$~$IN_3$ from the reproducers P1~P3 are respectively outputted, and for a time period from 120 min. to 180 min., video signals $IN_4$~$IN_6$ from the reproducers P4~P6 are respectively outputted.

By constructing such a relationship, when time elapsed from the reproduction start of the reproducer P is represented by t, e.g., from the output terminal O1, video signal $IN_1$ is outputted for a time period of the time elapsed t=0 min.~60 min., video signal $IN_4$ is outputted from a time period of the time elapsed t=60 min.~120 min., and the video signal $IN_1$ is outputted for a second time for a time period of the time elapsed t=120 min.~180 min.

Accordingly, the video selector switch 2 can output, as channels CH1~CH6, video signals outputted from the output terminals O1~O6 in the state where reproduction start times are shifted by 20 minutes with respect to, e.g., adjacent channels by the above-mentioned switching operation as shown in FIG. 5C.

The channels CH1~CH6 are adapted so that the image source is divided into two reproduction blocks B of divided image source [image (0~60)] and divided image source |image (60~120)| to select channels which maintain continuity from these reproduction blocks B, whereby even if the length of the image source is two hours which is longer by one hour than the memory capacity of the medium of the reproducer P, it is possible to out put image sources without damaging continuity of the image sources.

The viewer only selects the image source of the channel in which the wait time from the current time point to the start of reproduction is the shortest among the channels CH1~CH6, thereby making it possible to providing an access of a desired image source to the terminal equipment in the wait time of 20 minutes at the maximum.

Further, as a more practical example, for example, when the viewer desires viewing of image source at t=65 min. after 65 min. have been passed from the reproduction time elapsed t=0 min. as a reference, the minimum wait time until the leading portion of the image source (i.e., divided image source [image (0~60)] is started is 15 min. When the time when this reproduction is started is represented by the reproduction time elapsed t, t is equal to 80 min. The divided image source |image (0~60)| in which reproduction is started from the reproduction time elapsed t=80 min. is the video signal $IN_2$. The reproducer P2 delivers the reproduced video signal $IN_2$ to input terminal I2 of the video selector switch 2.

It is seen that the output terminal in which the video signal $IN_2$ delivered to the input terminal I2 is outputted in the reproduction time elapsed t=80 min. is searched from FIG. 5B, the output terminal O5 corresponds thereto. From this relationship, the video selector switch 2 connects the input terminal I2 and the output terminal O5 to output the video signal $IN_2$ from the output terminal O5. It is seen from FIG. 5C that the channel of the video signal outputted from the output terminal O5 is the channel CH5.

Similarly, the reproducer P which starts reproduction of the divided image source |image (60~120)| at the reproduction time elapsed t=140 min. is the reproducer P5 of FIG. 5A. It is seen that video signal $IN_5$ is outputted from the reproducer P5. The video selector switch 2 connects the input terminal I5 supplied with the video signal $IN_5$ and the output terminal O5. Thus, the video signal output unit can provide video signals from the output channel CH5 as video signals continuous for two hours of the reproduction time elapsed from t=80 min. to 200 min.

It should be noted that the video selector switch 2 is preferably constituted with, e.g., matrix switcher from the necessity in which selective switching as described above is carried out.

Moreover, when an approach is employed such that video signals of channels CH1, CH3, CH5 that the video selector switch 2 outputs are used, image sources of two hours are outputted in the state where they are shifted by 40 min. In addition, when an approach is employed such that video signals of the channels CH1 and CH4 are used, divided image sources are outputted in the state where they are shifted by 60 min.

Figure 6:
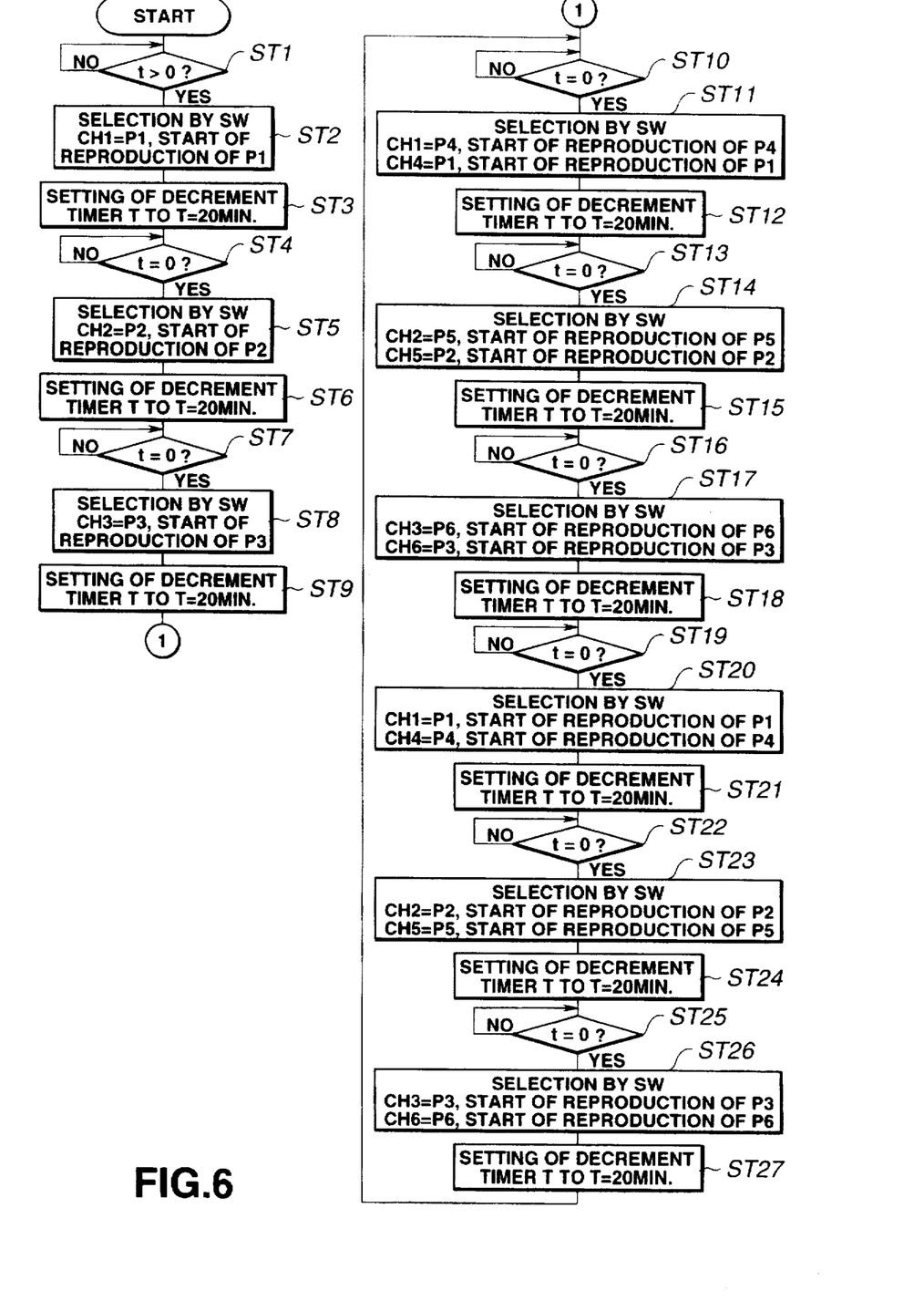
FIG. 6 is a flowchart for explaining the reproduction operation of video signal.

The operation of the above-described video signal output unit will now be described with reference to the flowchart shown in FIG. 6.

When the reproduction operation is started, whether or not the reproduction time elapsed t of the divided image source is 0 min. is discriminated at step ST1. It should be noted that an approach may be employed to directly start reproduction of divided image source by real time control signal, etc. which will be described later without discriminating whether or not the reproduction time elapsed of divided image sources is 0 min as described above.

If it is detected that the reproduction elapsed time t of the divided image source is 0 min., the reproducer P1 is connected to the channel CH1 by the video selector switch 2 at step ST2. Namely, the video signal reproduced from the reproducer P1 is caused to be outputted to the channel CH1. In addition, reproduction of the divided image source [image (0~60)] is started from the reproducer P1. Thus, video signal $IN_1$ is outputted from the channel CH1. Subsequently, at step ST3, decrement timer T is set to 20 minutes. At the subsequent step ST4, whether or not the decrement timer T is equal to zero, i.e., whether or not 20 minutes are passed is discriminated. When it is discriminated that the decrement timer T is equal to 0 min., the processing operation proceeds to step ST5.

At this step ST5, the reproducer P2 is connected to the channel CH2 by the video selector switch 2. Moreover, reproduction of the image source [image (0~60)] is started from the reproducer P2. Thus, video signal $IN_2$ is outputted from the channel CH2. Subsequently, at step ST6, the decrement timer T is set to 20 min. At the subsequent step ST7, whether or not the decrement timer T is equal to zero is discriminated. When it is discriminated that the decrement timer T is equal to zero, the processing operation proceeds to the step ST8.

At the step ST8, the reproducer P3 is connected to the channel CH3 by the video selector switch 2. Moreover, reproduction of the divided image source [image (0~60)] is started from the reproducer P3. Thus, video signal $IN_3$ is outputted from the channel CH3. Subsequently, at step ST9, the decrement timer T is set to 20 min. At the subsequent step ST10, whether or not the decrement timer T is equal to zero is discriminated. When it is discriminated that the decrement timer T is equal to 0 min., the processing operation proceeds to step ST11.

At the step ST11, the reproducer P4 is connected to the channel CH1 by the video selector switch 2. It is to be noted that, at this time, connection between the reproducer P1 and the channel CH1 is released. Namely, one input delivered to one video selector switch 2 is caused to be outputted only from one output. It is to be noted that, with respect to processing at times subsequent thereto, although reference is not made with respect thereto, similar processing will be carried out.

When reproduction of the divided image source |image (60~120)| is started from the reproducer P4, the video signal $IN_4$ is outputted from the channel CH1. Thus, the divided image source |image (60~120)| is outputted from the channel CH1 subsequently to the divided image source |image (0~60)|. It is to be noted that the reproducer P1 serves to automatically repeat reproduction operation, and may serve to repeatedly carry out, from the leading portion, reproduction operation of the divided image source |image (0~60)|. Simultaneously with this, the reproducer P1 is connected to the channel CH4 by the video selector switch 2. When reproduction of the divided image source |image (0~60)| is started for a second time from the reproducer P1, the video signal $IN_1$ is outputted from the channel CH4. Subsequently, at step ST12, the decrement timer T is set to 20 min. At the subsequent step ST13, whether or not the decrement timer T is equal to zero is discriminated. When it is discriminated that the decrement timer T has been 0 min., the processing operation proceeds to step ST14.

At this step ST14, the reproducer P5 is connected to the channel CH2 by the video selector switch 2. When reproduction of the divided image source [image (60~120)] is started from the reproducer P5, video signal $IN_5$ is outputted from the channel CH2. Thus, the divided image source [image (60~120)] is outputted from the channel CH2 subsequently to the divided image source [image (0~60)]. Simultaneously with this, the reproducer P2 is connected to the channel CH5 by the video select switch 2. When reproduction of the divided image source |image (0~60)| is started from the reproducer P2, the video signal $IN_2$ is outputted from the channel CH5. Subsequently, at step S15, the decrement timer T is set to 20 min. At the subsequent step S16, whether or not the decrement timer T is equal to zero is discriminated. When it is discriminated that the decrement timber T has been 0 min., the processing operation proceeds to step ST17.

At this step ST17, the reproducer P6 is connected to the channel CH3 by the video selector switch 2. When reproduction of the divided video source |image (60~120)| is started from the reproducer P6, video signal $IN_6$ is outputted from the channel CH3. Thus, divided image source [image (60~120)] is outputted from the channel CH3 subsequently to the divided image source [image (0~60)]. Simultaneously with this, the reproducer P3 is connected to the channel CH6 by the video selector switch 2. When reproduction of the divided image source [image (0~60)| is started from the reproducer P3, the video signal $IN_3$ is outputted from the channel CH6. Subsequently, at step ST18, the decrement timer T is set to 20 min. At the subsequent step ST19, whether or not the decrement timer T has been equal to 0 min., is discriminated. When it is discriminated that the decrement timer T has been equal to 0 min., the processing operation proceeds to step ST20.

At the step ST20, the reproducer P1 is connected to the channel CH1 by the video selector switch 2. When reproduction of the divided image source |image (0~60)| is started from the reproducer P1, the video signal $IN_1$ is outputted from the channel CH1. Thus, divided image source |image (0~60)| is outputted from the channel CH1 subsequently to the divided image source |image (60~120)|. Simultaneously with this, the reproducer P4 is connected to the channel CH4 by the video selector switch 2. When reproduction of divided image source |image (60~120)| is started from the reproducer P4, the video signal $IN_4$ is outputted from the channel CH4. Thus, the divided image source |image (60~120)| is outputted from the channel CH4 subsequently to the divided image source |image (0~60)|. Subsequently, at step ST21, the decrement timer T is set to 20 min. At the subsequent step ST22, whether or not the decrement timer T has been equal to 0 is discriminated. When it is discriminated that the decrement timer T has been equal to 0, the processing operation proceeds to step ST23.

At the step S23, the reproducer P2 is connected to the channel CH2 by the video selector switch 2. When reproduction of the divided image source |image (0~60)| is started from the reproducer P2, the video signal $IN_2$ is outputted from the channel CH2. Thus, the divided image sources [image (0~60)] is outputted from the channel CH2 subsequently to the divided image source |image (60~120)]. Simultaneously with this, the reproducer P5 is connected to the channel CH5 by the video selector switch 2. When reproduction of the divided image source [image 60~120] is started from the reproducer P5, the video signal IN5 is outputted from the channel CH5. Thus, the divided image source [image (60~120)] is outputted from the channel CH5 subsequently to the divided image source [image (0~60)]. Subsequently, at step S24, the decrement timer T is set to 20 min. At the subsequent step S25, whether or not the decrement timer T has been equal to zero is discriminated. When it is discriminated that the decrement timer T has been equal to 0 min., the processing operation proceeds to the step ST26.

At the step ST26, the reproducer P3 is connected to the channel CH3 by the video selector switch 2. When reproduction of the divided image source [image (0~60)| is started from the reproducer P3, the video signal $IN_3$ is outputted from the channel CH3. Thus, the divided image source [image (0~60)] is outputted from the channel CH3 subsequently to the divided image source [image (60~120)]. Simultaneously with this, the reproducer P6 is connected to the channel CH6 by the video selector switch 2. When reproduction of the divided image source [image (60~120)] is started from the reproducer P6, the video signal $IN_6$ is outputted from the channel CH6. Thus, the divided image source [image (60~120)] is outputted from the channel CH6 subsequently to the divided image source [image (0~60)]. Subsequently, at step ST27, the decrement timer T is set to 20 min. Then, the processing operation returns to the step ST10, at which whether or not the decrement timer T has been equal to 0 is discriminated. When it is discriminated that the decrement timer T has been equal to 0 min., the processing operation proceeds to the step S11.

In a manner as stated above, in the video signal output unit, divided image sources are outputted from respective channels with the continuity being maintained. Such output operation is repeatedly carried out until the power of the video signal output unit is turned OFF, or end instruction is sent.

The configuration of so called video server to which the video signal output apparatus of this invention is applied will now be described with reference to FIG. 7.

Also in this video server, the length of the image source is set to two hours.

Figure 7:
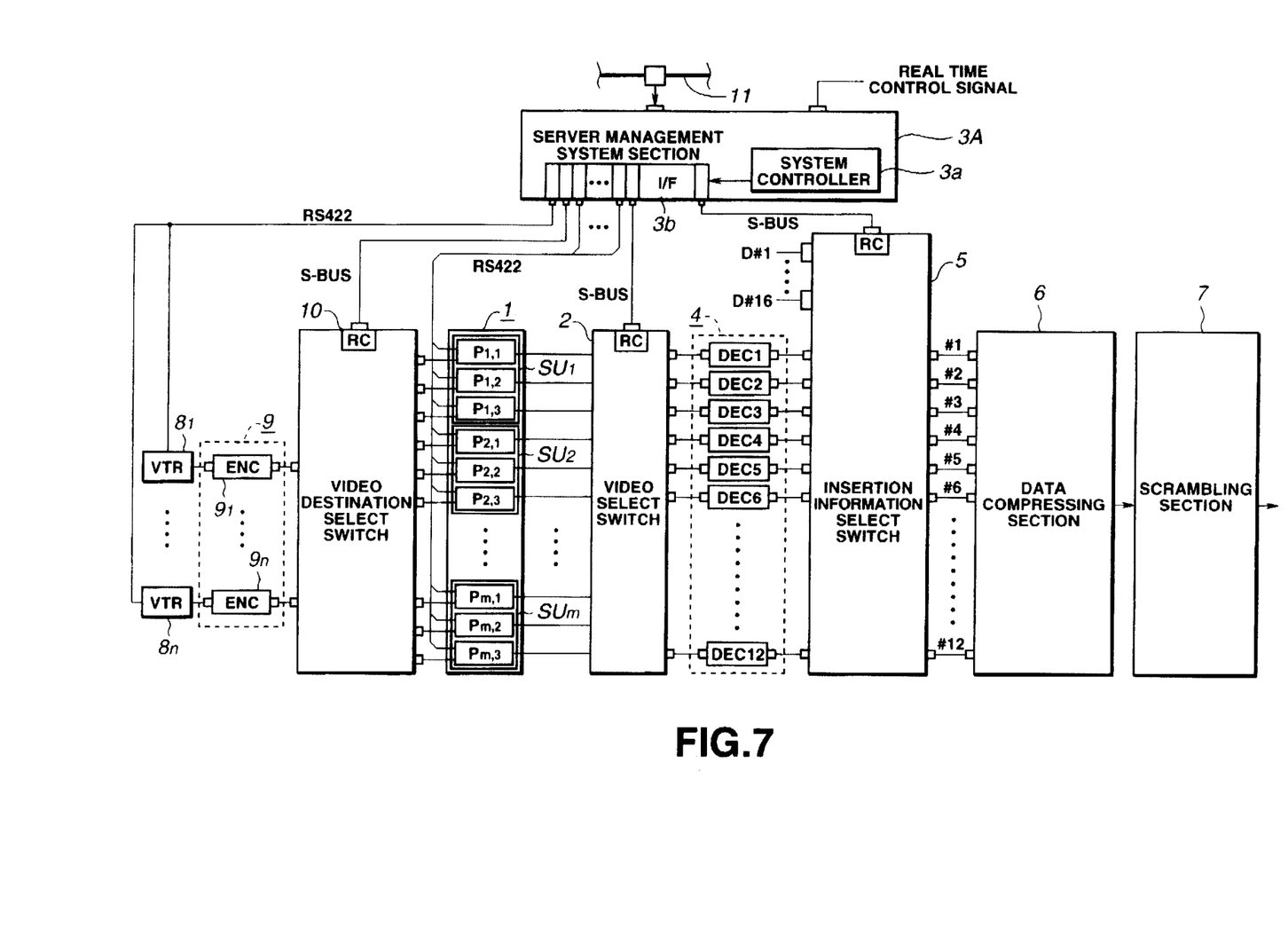
FIG. 7 is a block diagram showing outline of the configuration of a video server.

This video server is composed, as shown in FIG. 7, for example, of a video reproduction section 1, video select switch 2, a server management system section 3A having a system controller 3a corresponding to the switching control section 3, a plurality of VTRs $8_1$~$8_n$, an encode section 9, a video destination select switch 10, a decoder section 4, an insertion information select switch 5, a data compressing section 6, and a scrambling section 7.

The video reproducing section 1 is composed of server units $SU_1$~$SU_m$. These server units $SU_1$~$SU_m$ are provided every respective image sources, i.e., titles of movies. These server units $SU_1$~$SU_m$ are constituted, e.g., with reproduction blocks B1~B4 being as one set as shown in FIG. 8.

With respect to respective divided image sources which have been obtained by quartering the image source of 120 min., the divided image source that the reproduction block $B_1$ reproduces is represented by (0 to 30 min.), the divided image source that the reproduction block $B_2$ reproduces is represented by (30-60 min.), the divided image source that the reproduction block $B_3$ reproduces is represented by (60-90 min.), and the divided image source that the reproduction block B4 reproduces is represented by (90-120 min.).

Figure 8:
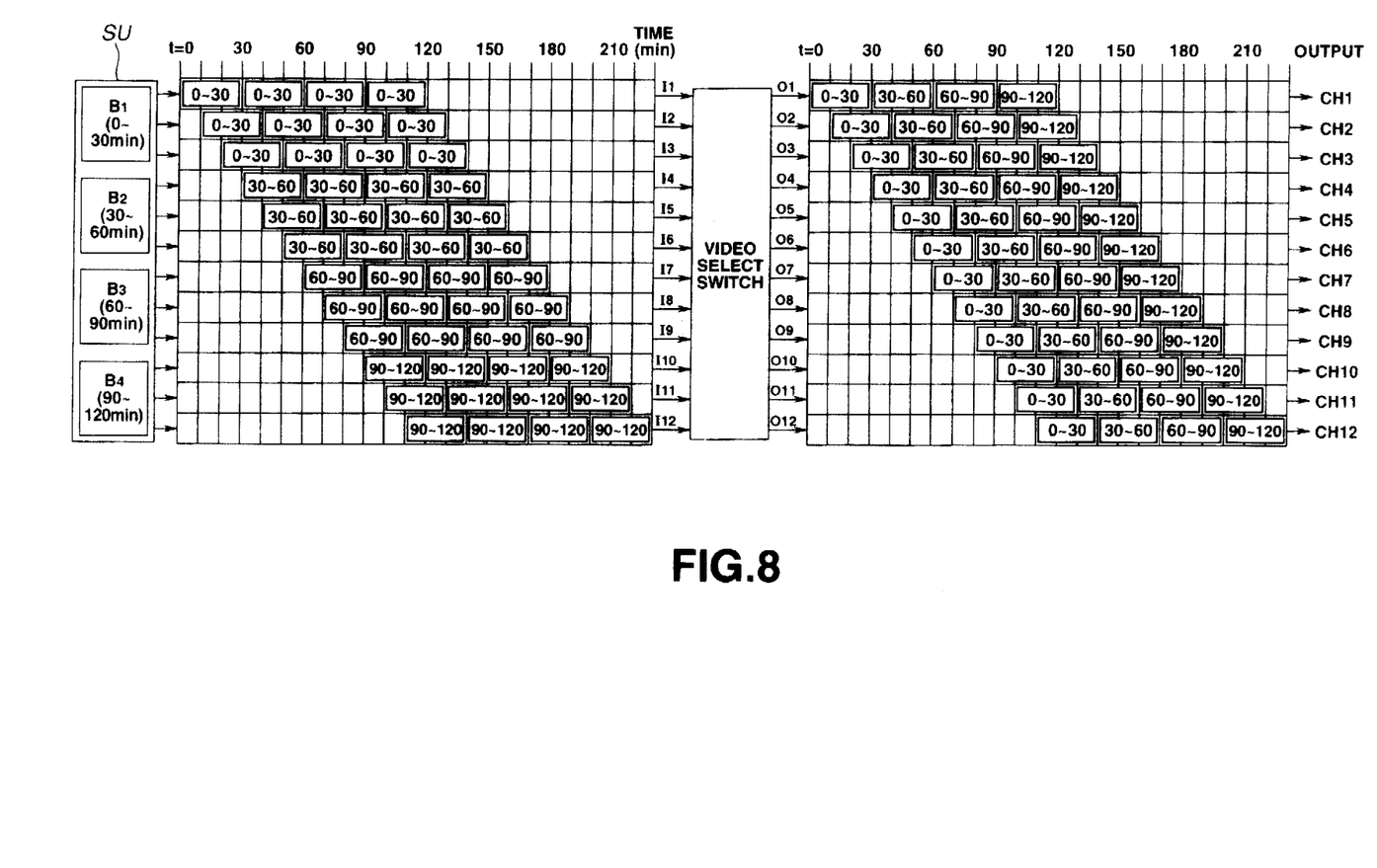
FIG. 8 is a view for explaining reproduction control at 10 minutes interval and selective control of image to be reproduced in the video server.

Moreover, the time interval, i.e., reproduction shift time $T_i$ in respective reproduction blocks B is set to 10 (min.) as apparent from FIG. 8. For this reason, it is sufficient that at least three reproducers P are disposed in the respective reproduction blocks B. Accordingly, an approach is employed to output divided image sources which have been quartered from the respective reproduction blocks B shown in FIG. 8 in the state where respective reproduction starting times are delayed by 10 min., whereby 12 video signals are outputted from the server unit SU to the video select switch 2. Respective reproducers P repeatedly reproduce video signals of 30 min.

The video select switch 2 carries out switching control corresponding to a control signal delivered from a system controller 3a in the server management system section 3A through an interface (hereinafter referred to as I/F), whereby switching is carried out so as to maintain continuity of image sources.

The selection procedure in the case where a signal which has been subjected to selective switching by the viewer is inputted after 55 min. has been passed from the reproduction time elapsed t=0 min. will now be described.

In FIG. 8, it is seen that the channel in which divided image source (0-30 min.) delivered from the reproduction block $B_1$ is to be outputted from the reproduction time elapsed t=60 min. is channel CH7. Thus, when the viewer selects the channel CH7, the video select switch 2 connects an input terminal I1 and output terminal O7 at the reproduction time elapsed t=60 min. The video signal output unit outputs, from the output channel CH7, the divided image source (0-30 min.) after such switching operation.

Then, reproduction of divided image source (30-60 min.) required for a time period from the reproduction time elapsed t=90 min. after 30 minutes have been passed up to the reproduction time elapsed t=120 min. is carried out at the reproduction block $B_2$ (see FIG. 8). The video select switch 2 selects input terminal I4 connected to the reproducer P which starts reproduction of divided image source (30 to 60 min.) at the reproduction time elapsed t=90 min. to connect the input terminal I4 to output terminal O7. The video signal output unit outputs, from the output channel CH7, the divided image source (30–60 min.) after such switching operation.

Moreover, reproduction of divided image source (60-90 min.) required for a time period from the reproduction time elapsed t=120 min. after 60 min. have been passed up to the reproduction time elapsed t=150 min. is carried out at the reproduction block $B_3$. The video select switch 2 selects input terminal I7 connected to the reproducer P which starts reproduction of the divided image source (60-90 min.) at the reproduction time elapsed t=120 min. to connect the input terminal I7 to the output terminal O7. The video signal output unit outputs, from the output channel CH7, the divided image source (60 to 90 min.) after such switching operation.

Further, reproduction of divided image source (90-120 min.) required for a time period from the reproduction time elapsed t=150 min. after 90 min. have been passed up to the reproduction time elapsed t=180 min. is carried out at the reproduction block $B_4$. The video select switch 2 selects input terminal I10 connected to the reproducer P which starts reproduction of the divided image source (90-120 min.) at the reproduction time elapsed t=150 min. to connect the input terminal I10 to the output terminal O7. The video output unit outputs, from the output channel CH7, the divided image source (60-90 min.) after such switching operation.

Accordingly, the viewer can continuously appreciate (enjoy) images, without carrying out any switching operation at times subsequent thereto, for two hours, from the beginning thereof, after five minutes from the time when channel selective switching between image sources is carried out at the terminal equipment.

Figure 9:
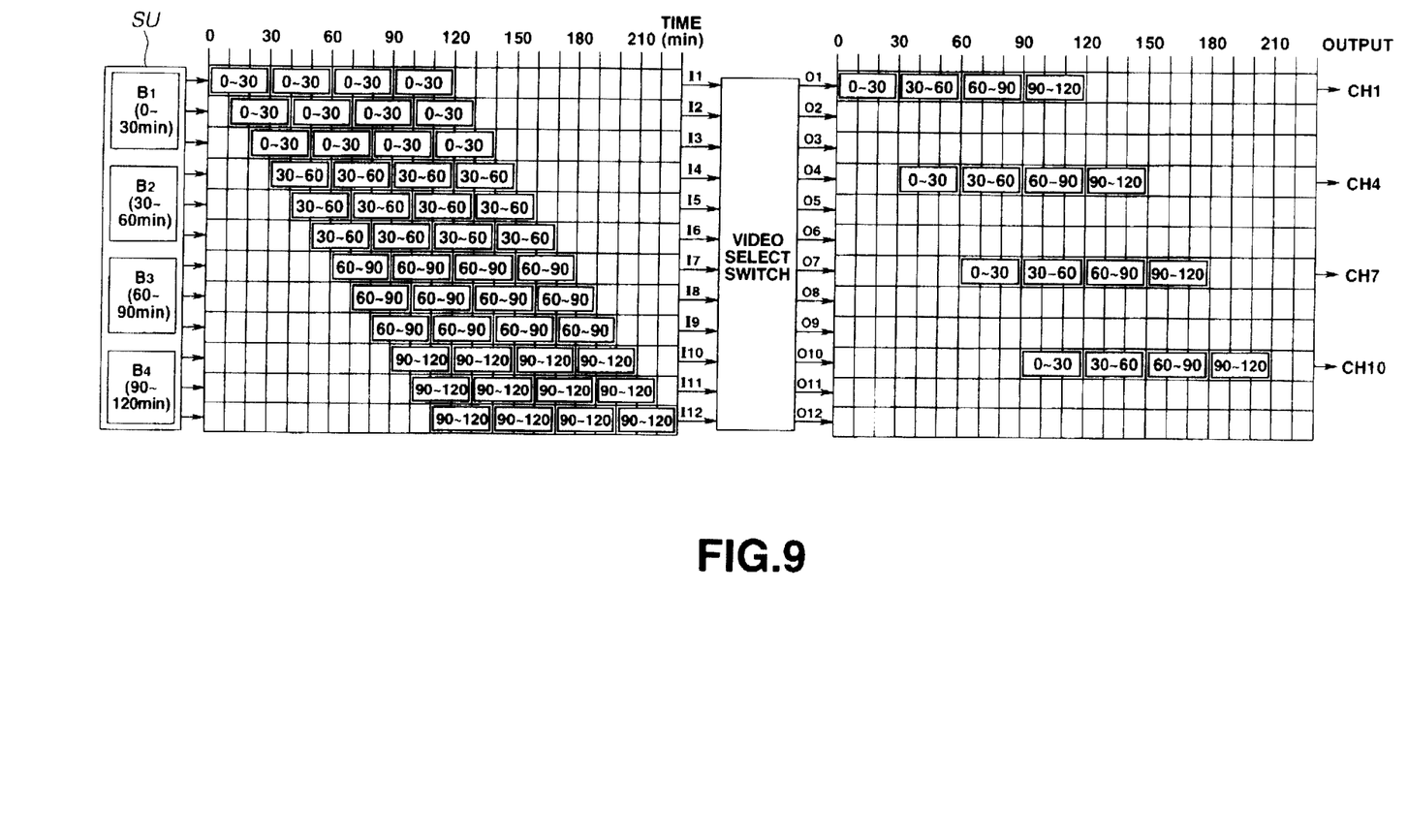
FIG. 9 is a view for explaining reproduction control at 30 minutes interval and selective control of image to be reproduced in the video server.

Moreover, in the case where the video server sets the reproduction shift time $T_i$ to 30 min., the viewer selects any one of four channels CH1, CH4, CH7, CH10 which output video signals every thirty min., thereby making it possible to continuously appreciate (enjoy) images, without carrying out any switching operation at times subsequent thereto, for two hours, from the beginning thereof.

The video signal outputted from the video select switch 2 is delivered to a decode section 4. The video signal delivered to the decode section 4 is decoded and expanded at the decode section 4. In this example, since respective server units $SU_1$~$SU_m$ reproduce respective divided image sources obtained by dividing one image source into four sections by using three reproducers P while shifting respective reproduction times by 10 min., 12 (twelve) decoders are required at the decode section 4. The video signal from the decode section 4 is delivered to the insertion information select switch 5.

The insertion information select switch 5 is a switch serving to selectively input data or still picture for a time period from the time when reproduction is completed up to start of the next reproduction to display such data or image on the terminal equipment of the viewer. Namely, this switch serves to insert image for the last five minutes with respect to image source less than 120 min., e.g., image source of 115 min. Twelve outputs #1~#12 from the insertion information select switch 5 are delivered to a data compressing section 6.

The data compressing section 6 implements, to data delivered thereto, compression suitable for communication, e.g., data compression for sending out the data to satellite. The data compressing section 6 delivers the compressed data to a scrambling section 7. The scrambling section 7 implements scrambling to the compressed data delivered thereto to send out the data to satellite.

Moreover, at this video server, VTR $8_1$~$8_n$ are provided in order to deliver new image source to the video reproducing section 1 when reorganization of program is carried out. These VTR $8_1$~$8_n$ are connected to the server management system section 3A, and is controlled by the server management system section 3A.

The VTRs $8_1$-$8_n$ respectively deliver reproduced video signals to encode circuits $9_1$-$9_n$ of an encode section 9. The encode section 9 implements data compression to video signals from the VTRs $8_1$-$8_n$ to deliver the compression processed video signals to video destination select switch 10. This video supply destination select switch 10 selects, in accordance with a control signal of the server management system section 3A, a server unit SU into which the video signal reproduced from the VTR is recorded.

Figure 10:
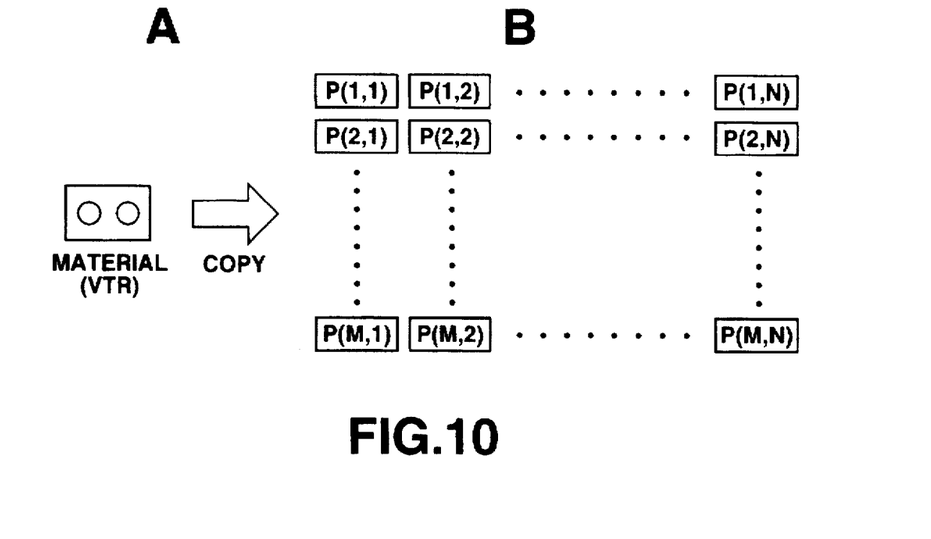
FIG. 10 is a view for explaining recording of video signals into respective reproducers.

In this example, in the recording operation of the image source, image source recorded on video tape is used as material as shown in FIG. 10A, for example to copy divided image sources of the same time zone of divided image sources obtained by the image source of the material by M with respect to (M×N) reproducers P shown in FIG. 10B.

In more practical sense, e.g., the divided image source of the first time zone of divided image sources is copied with respect to respective N reproducers $P_{(1,1)}$-$P_{(1,N)}$. Then, the divided image source of the next time zone is copied with respect to respective N reproducers $P_{(2,1)}$-$P_{(2,N)}$. By respectively copying the divided image source of the last time zone with respect to respective N reproducers $P_{(M,1)}$-$P_{(M,N)}$, it is possible to respectively copy M divided image sources of the same time zone with respect to respective (M×N) reproducers P.

Figure 11:
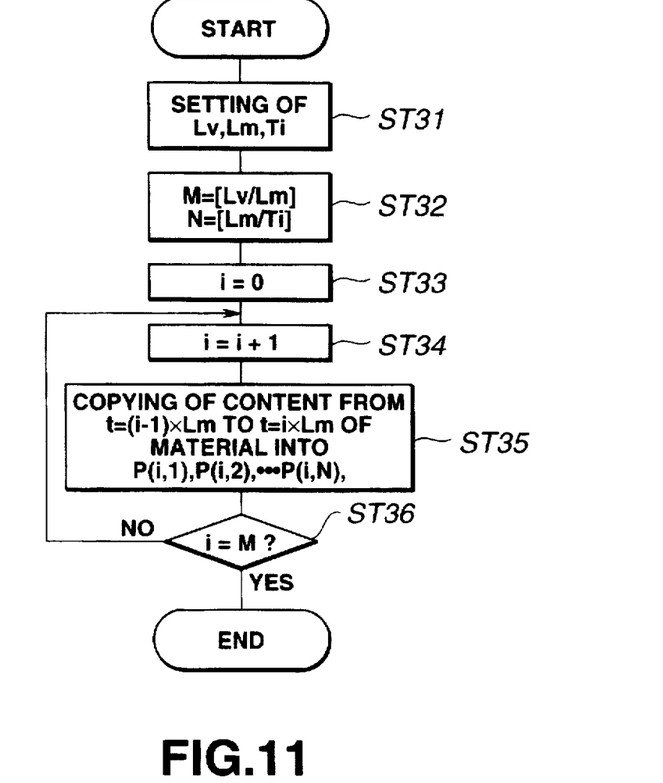
FIG. 11 is a flowchart for explaining recording operation of video signals into respective reproducers.

The recording operation procedure of the image source is shown in the flowchart of FIG. 11.

Initially, at step ST31 of FIG. 11, length of image source of the material $L_v$, the maximum reproduction time $L_m$ of the reproducer, and the reproduction shift time $T_i$ are respectively set.

At the subsequent step ST32, the value obtained by dividing length $L_v$ of the image source of the material by the maximum reproduction time $L_m$ of the reproducer is substituted for the value of M, and the number obtained by dividing the maximum reproduction time $L_m$ of the reproducer by the reproduction shift time $T_i$ is substituted for the value of N.

Thereafter, with the value of M being as variable (parameter) i, i is initially set to i=0 at step ST33. 1 is added to variable i at step ST34. At step ST35, divided video source of the first time zone of image sources of the material is copied into the respective first N reproducers $P_{(1,1)}$, $P_{(1,2)}$, . . . $P_{(1,N)}$. At the subsequent step ST36, whether or not parameter i is equal to the value of M is discriminated.

If the variable i is not equal to the value of M, it is judged that copying of all divided image sources is not completed. Accordingly, the processing operation returns to the step S34 to add 1 to variable i. At step S35, the divided image source of the next time zone is copied into respective video reproducing units $P_{(2,1)}$, $P_{(2,2)}$, . . . $P_{(2,N)}$. In a manner as stated above, the operations of the steps ST34 and ST35 are carried out until the divided image source of the last time zone is copied into the last N video reproducing units $P_{(M,1)}$, $P_{(M,2)}$ . . . $P_{(M,N)}$.

In more practical sense, when, e.g., length $L_v$ of the image source of the material is 120 min., the maximum reproduction time $L_m$ of the reproducer is 60 min., and the reproduction shift time $T_i$ is 20 min., 2 (=120/60) is substituted for M and 3 (=60/20) is substituted for N. Namely, the image source is divided into two time bands. Initially, the divided image source of the first time zone from 0 min. (=(1-1)×60) up to 60 min. (=1×60) is copied into three reproducers P. Then, the divided image source of the next time zone from 60 min. (=(2-1)×60) up to 120 min. (=2×60) is copied into three reproducers P.

The above-mentioned server management system section 3A is composed of a system controller 3a and an I/F section 3b. This server management section 3A is supplied with a control signal through a network line 11, i.e., so called Ethernet, or supplied as a real time control signal. The server management system 3A may be controlled by such a control signal from the external.

The server management system section 3A outputs signals for controlling respective circuit components through the I/F section 3b from the system controller 3a in accordance with a control signal from the external. The I/F section 3b connects respective server units $SU_1$-$SU_m$ of the video reproducing section 1 or VTR $8_1$-$8_n$ by way of cable of the so-called RS422 standard, and connects the video changeover switch 2, the insertion information changeover switch 5 and the video destination select switch 10 by way of S-bus.

By constructing such a video server, it is possible to construct a system having so called Near Video On Demand function corresponding to selection of a desired image source by the viewer also with respect to image source of data quantity corresponding to time longer than the memory capacity of the medium of the reproducer of the video reproducing section 1.

It is to be noted that while the image source is equally divided in the above-described embodiment, the reproduction time of the image source is not limited to division every predetermined time, but there may be employed an approach such that an unequal division is carried out to provide reproducers for carrying out repetitive reproduction while shifting divided image sources by the times corresponding to the division.

As is clear from the foregoing description, in accordance with this invention, it is possible to provide a video signal output apparatus having so called Near Video On Demand function to provide continuous image sources, without being conscious of time and switching operation of image source to be reproduced, in accordance with selection of a desired image source by the viewer by using inexpensive reproducers also with respect to image source of data quantity corresponding to time longer than the memory capacity of the medium of the reproducer. Thus, the manufacturing cost of the video signal output apparatus can be reduced.

Moreover, in the video signal output apparatus, in the case where a video signal reproduced from the video reproducing section is caused to undergo switching output by the video select switch, an approach is employed to carry out selective switching of arbitrary information from plural other information inserted for a time period from the time when supply of video signal of one image source is completed until reproduction of the next image source is started in accordance with a control signal from the switching control section by means of the insertion information select switch to implement data compression to the video signal which has been passed through the insertion information select switch at the data compressing section to implement scramble processing to an output signal from the data compressing section at the scrambling section to send out the video signal thus processed to the terminal equipment side. For a time period of interruption of image from the insertion information select switch, any other information is delivered to select output destination of the image source delivered with respect to the video reproducing section by means of video destination select switch in accordance with a control signal from the switching control section, thereby making it possible to provide services to the viewer. This facilitates to cope with selection of desired image source by the viewer. Thus, improvement in the service and increase in flexibility can be made.

Video signal output apparatuses adapted for permitting one program to be simultaneously delivered to plural subscribers can be applied to a system of the Near Video On Demand System as described above. When such a system is utilized, the viewers effect payment of fee corresponding to the cost of the hardware and the software to the program providing company.

Meanwhile, in order to popularize the system as described above, it is important that utilization fee is reduced to low value.

However, in the above-described video signal output unit, in the case where image source of the same content is reproduced, reproducers are required by (M×N) which is the same number as that of channels. As a result, in the case where a plurality of image sources are outputted, the cost of the video signal output apparatus would be increased.

Figure 12:
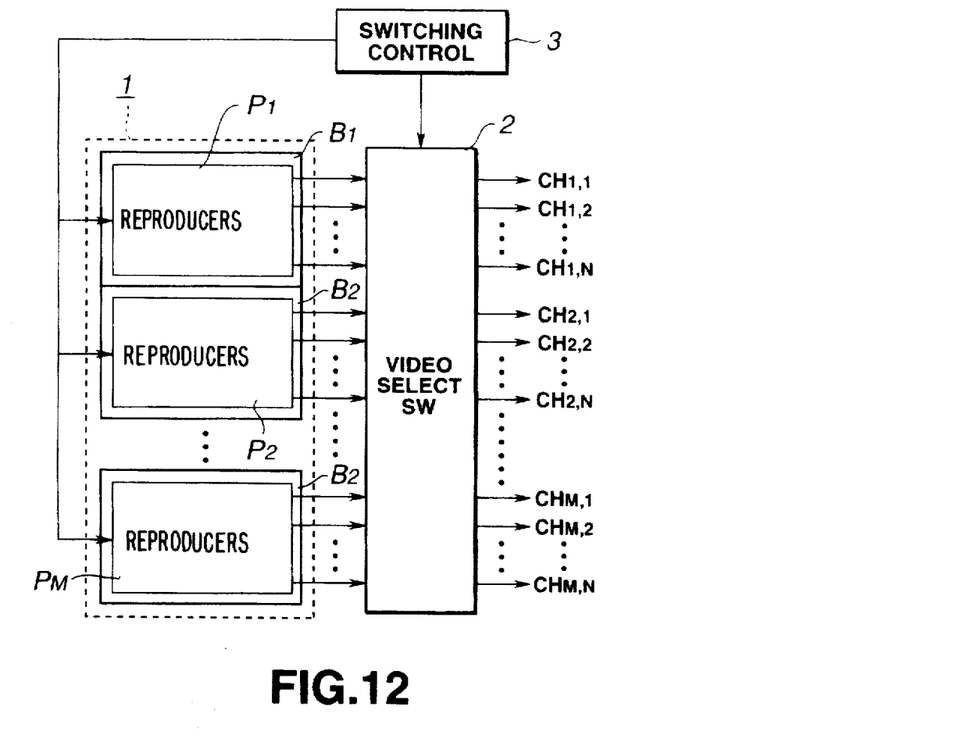
FIG. 12 is a block diagram showing outline of a second embodiment of a video signal output apparatus according to this invention.

In view of the above, the video signal output unit may be constituted as shown in FIG. 12. The video signal output unit shown in FIG. 12 differs from the video signal output unit shown in FIG. 3, when comparison therebetween is made, only in that a single reproducer P is provided within each reproduction block B. A more practical configuration for simultaneously reproducing a plurality of divided signals by one reproducer P in the state where they are shifted by a predetermined time is shown in FIG. 13.

Figure 13:
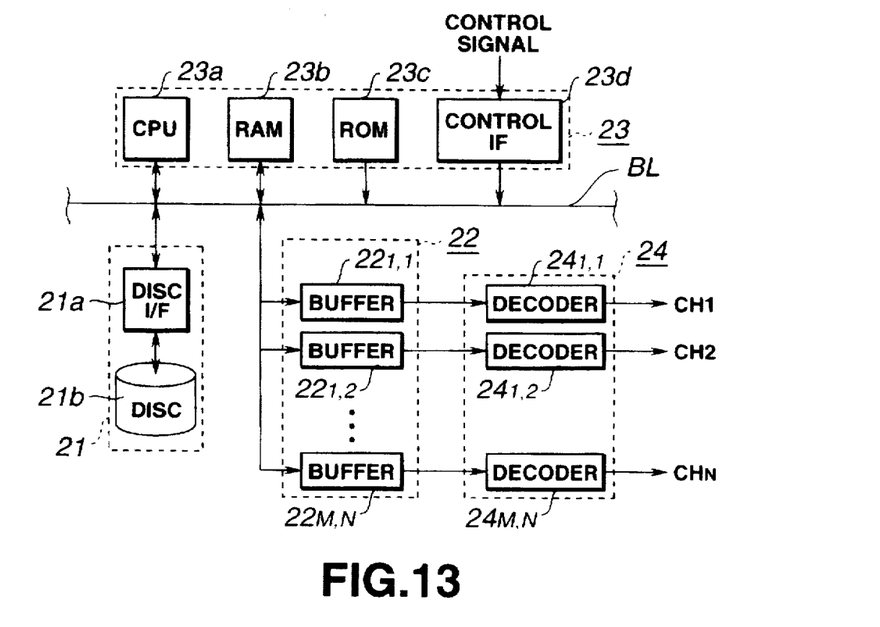
FIG. 13 is a block diagram showing a more practical configuration of the video signal output apparatus.

The reproducer P shown in FIG. 13 interprets a control signal delivered through a control interface 23d by a CPU 23a to carry out an access of data through bus line BL in accordance with the programs stored in RAM 23b, ROM 23c. A disc unit 21a of the video reproducing section 21 is adapted to record image sources in data-compressed state on the disc which is the recording medium.

The video signal which has been reproduced by the disc unit 21a is read out through the disc interface 21b, and is once stored into respective buffers $22_{1,1} \sim 22_{M,N}$ of the corresponding channel.

It is to be noted that since image sources are recorded in a compressed state, it is possible to read out image sources of plural channels in the same time as the time required for read-out of image source of one channel in the embodiment shown in FIG. 3, etc.

The video signals stored in the respective buffers $22_{1,1} \sim 22_{M,N}$ are respectively decoded at the decoding section 24 so that data quantity is expanded. The video signals thus expanded are respectively outputted from the respective channels CH1~CHN.

Namely, since stored data is expanded and outputted in a form compressed to more degree as compared to the data quantity in the circuit of the video select switch 2 and circuits succeeding thereto, it is possible to simultaneously output a plurality of image sources shifted by a predetermined time by one reproducer P. In addition, an approach may be employed, in place of carrying out data compression, to simultaneously reproduce data at different positions by using multi-channel head to thereby permit a plurality of image sources shifted by a predetermined time by one reproducer P to be simultaneously outputted.

It should be noted that while the decode section 24 is disposed at the succeeding stage of the video select switch 22 in this embodiment, there may be employed a configuration such that the decode section 24 is disposed at the preceding stage of the video select switch 22.

Moreover, while explanation has been given by taking the example where only one disc unit is provided, there may be employed the configuration in which a plurality of disc units are provided to allow the video select switch 22 to send out a plurality of image sources, thus to permit expandability of the video signal output apparatus to be improved.

By employing the above-described configuration, also with respect to image source of the data quantity corresponding to time longer than the capacity of each of media of the reproducers that the video reproducing section has, inexpensive reproducers are used to simultaneously provide, in correspondence with a plurality of channels, successive image sources without being conscious of time and switching operation of image sources reproduced in accordance with selection of a desired image source by the viewer, thereby making it possible to reduce the number of reproducers of which number is the same as that of channels required for the configuration which realizes so called Near Video On Demand function to 1/M. Thus, the manufacturing cost can be reduced to more degree.

What is claimed is:

1. A video signal output apparatus comprising:

first reproducing means, with respect to first and second divided image sources obtained by dividing an image source into image sources of two time zones, for simultaneously repeatedly reproducing the first divided image source of a first time zone as a plurality of outputs from timings respectively shifted by a predetermined time;

second reproducing means for simultaneously repeatedly reproducing the second divided image source as a plurality of outputs from timings respectively shifted by the predetermined time;

switching means including a plurality of input terminals respectively supplied with outputs of the first and second reproducing means, and a plurality of output terminals of which number is the same as that of the input terminals; and control means for controlling the switching means so as to carry out, every said predetermined time, switching of connection of the input terminals with respect to the respective output terminals so that the first divided image source and the second divided image source are alternately outputted from the respective output terminals of the switching means.

2. A video signal output apparatus as set forth in claim 1, wherein the first reproducing means, the second reproducing means, the switching means and the control means are provided with respect to respective different plural image sources.

3. A video signal output apparatus comprising:

a reproduction block including a plurality of reproducing means respectively provided with respect to a plurality of divided image sources obtained by dividing an image source into image sources of a plurality of time zones, the plurality of reproducing means being provided by the number determined in accordance with a total time of the divided image sources and a predetermined time for simultaneously repeatedly reproducing the divided image sources as a plurality of outputs in which reproduction timings are respectively shifted by the predetermined time, and adapted to simultaneously repeatedly reproduce the divided image sources as a plurality of outputs in the state where the reproduction timings thereof are respectively shifted by the predetermined time;

switching means including a plurality of input terminals respectively supplied with outputs of the plurality of reproducing means, and a plurality of output terminals of which number is the same as that of the input terminals; and control means for controlling the switching means so as to carry out, every said predetermined time, switching of connection of the input terminals with respect to the respective output terminals so that the plurality of divided image sources are sequentially outputted in accordance with the number of divisions from the respective output terminals of the switching means.

4. A video signal output apparatus as set forth in claim 3, wherein the image source includes different plural image sources, the apparatus includes the plural reproduction blocks corresponding to the number of the plural image sources, the switching means includes a plurality of input terminals of which number is the same as that of the reproducing means that the plural reproduction blocks have and output terminals of which number is the same as that of the input terminals with respect to the respective plural reproduction blocks, and the control means controls the switching means so as to carry out, every said predetermined time, switching of connection of the input terminals with respect to the output terminals, with respect to the plural output terminals and the plural input terminals corresponding to the respective reproduction blocks so that the plurality of divided image sources corresponding to the respective reproduction blocks are sequentially outputted in accordance with the number of divisions from the respective plural output terminals corresponding to the respective reproduction blocks of the switching means.

* * * * *